United States Patent [19]

Livesay

[11] 4,277,199
[45] Jul. 7, 1981

[54] KEEPER ASSEMBLY
[75] Inventor: Richard E. Livesay, Peoria, Ill.
[73] Assignee: Caterpillar Tractor Co., Peoria, Ill.
[21] Appl. No.: 83,998
[22] PCT Filed: Mar. 23, 1979
[86] PCT No.: PCT/US79/00187
§ 371 Date: Mar. 23, 1979
§ 102(e) Date: Mar. 23, 1979
[87] PCT Pub. No.: WO80/02059
PCT Pub. Date: Oct. 2, 1980
[51] Int. Cl.³ .............................................. F16B 21/16
[52] U.S. Cl. .................................... 403/317; 403/360;
403/326
[58] Field of Search ................. 403/326, DIG. 7, 316,
403/317, 318, 319, 360, 261; 85/8.8

[56] References Cited
U.S. PATENT DOCUMENTS

| | | |
|---|---|---|
| 684,664 | 10/1901 | Anderson ............... 287/DIG. 7 UX |
| 1,758,515 | 5/1930 | Heiermann ........................... 403/155 |
| 2,595,787 | 5/1952 | Heimann . |
| 2,747,953 | 5/1956 | Laubender ....................... 403/155 X |
| 2,823,081 | 2/1958 | Mayo .................................. 305/59 X |
| 3,398,977 | 8/1968 | Yoneda ............................. 285/321 X |
| 3,884,509 | 5/1975 | Marsh, Jr. ............................. 285/37 |
| 3,888,597 | 6/1975 | Datta ................................... 285/321 |
| 4,019,824 | 4/1977 | Percy ............................... 403/360 X |
| 4,061,366 | 12/1977 | Affa ..................................... 285/305 |
| 4,163,589 | 8/1979 | Fox et al. ......................... 403/155 X |

Primary Examiner—Andrew V. Kundrat
Attorney, Agent, or Firm—Charles E. Lanchantin, Jr.

[57] ABSTRACT

A keeper assembly transmits force from a second member (32) for a forced transmitting surface force (68) to first member (16) having an annular groove (42). A plurality of keeper segments (40) are located in the groove (42) and transfer force from the forced transmitting surface (68) into the first member (16). Each keeper segment has an axially outwardly opening side seat (56) and retaining means (44) are releasably connected to the side seats (56) for holding the keeper segments (40) positively in the groove (42).

8 Claims, 5 Drawing Figures

KEEPER ASSEMBLY

DESCRIPTION

1. Technical Field

The present invention relates to a keeper assembly wherein a plurality of replaceable keeper members provide a shoulder which functions to secure a first member against axial displacement with respect to a second member, and particularly to a retaining device for holding the keeper members in place.

2. Background Art

It is well known to utilize C-shaped retaining rings or snap rings capable of being spread and inserted over the end of a shaft and released into a groove around the shaft. Such rings are elastically deformed upon initial installation and are allowed to snap back toward their unstressed positions into the groove.

Retaining rings having either a rectangular or circular cross sectional shape are conventionally used by the industry to prevent axial displacement of a bushing, for example, on a cylindrical shaft. Those rings having a circular cross section and mating with shallow semicircular grooves can only resist moderate axial forces, while those rings having a rectangular cross section can resist substantially higher axial forces. Although the rectangular retaining rings provide a more positive shoulder in a plane transverse the central axis of the shaft for resisting higher axial forces, the opposite sharp edged groove root corner causes high stresses in the shaft and a limitation on the load carrying capability of the assembly.

In one keeper assembly construction the maximum axial load retention capability is greatly extended. In that construction, a plurality of arcuate keeper segments having a preselected cross sectional shape are positioned in a correspondingly profiled groove. Failure can occur at only very high loads in the end of the shaft by a shear failure cone eminating about halfway up the side of the groove. Actual use of the referenced keeper assembly is in the environment of an endless track chain joint, where space is at a premium. Unfortunately, the arcuate keeper segments must be inserted radially into the groove in the track pin shaft within a counterbore in a link prior to the installation of a retaining cap in the counterbore. It is prior to the assembly of the retaining cap that one or more of the keeper segments can loosen and move radially outwardly from the groove and can interfere with proper insertion of the retaining cap resulting in a loss of time and effort.

In view of the above, what is needed is a keeper assembly better able to hold the arcuate keeper segments positively in place in the groove.

SUMMARY OF THE INVENTION

According to the present invention, a keeper assembly is provided having a plurality of arcuate keeper segments located in an annular groove of a first member for receiving axial loads from a force transmitting surface of a second member. Advantageously, each keeper segment has an axially outwardly opening side seat, and a retaining member is releasably connected to the side seats for holding the keeper segments positively in the groove.

BEST MODE FOR CARRYING OUT THE INVENTION

Figure 1:
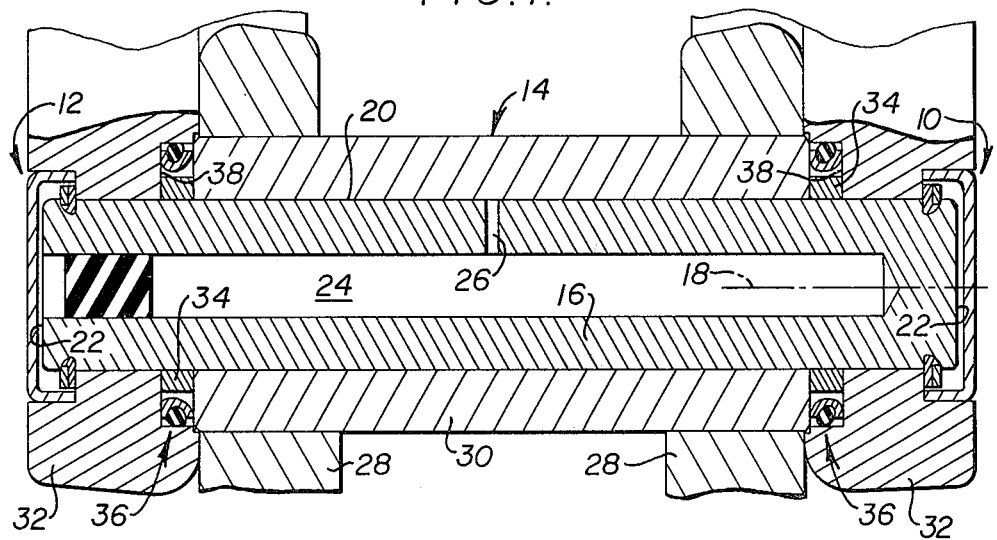
FIG. 1 is a diagrammatic, fragmentary, cross sectional view of a track chain joint illustrating a pair of keeper assemblies constructed in accordance with the present invention.

In the embodiment of the invention illustrated in FIG. 1, a first keeper assembly 10 and a second identical keeper assembly 12 are shown in connection with the opposite sides of a representative one of a plurality of interconnected endless track chain joints 14. Each of the joints 14 includes a track pin 16 having a central axis 18, a cylindrical outer surface 20 and a pair of opposite end surfaces 22. A lubricant reservoir 24 is formed within the pin and one or more radial passages 26 communicate fluid in the reservoir to the outer surface centrally of the pin. A first pair of track links 28 is mounted as by a press fit on the opposite ends of a hollow cylindrical track bushing 30, and a second pair of track links 32 is mounted as by a press fit on the opposite ends of the track pin. Thus, the bushing and the inner track links 28 are free to rotate centrally on the track pin about the axis 18, while the outer track links 32 are relatively firmly secured to the track pin. A pair of spacer rings 34 transmit axial loads between the bushing and the outer track links and to define the minimum spacing the rebetween for axial dimensional control of a pair of end face seal ring assemblies 36 circumscribing the spacer rings and disposed in a respective one of a pair of counterbores 38 in the outer track links. The aforementioned track chain joint construction, including the spacer rings and the seal ring assemblies, for example, but excluding the keeper assemblies 10 and 12, is generally well known in the art.

Figure 2:
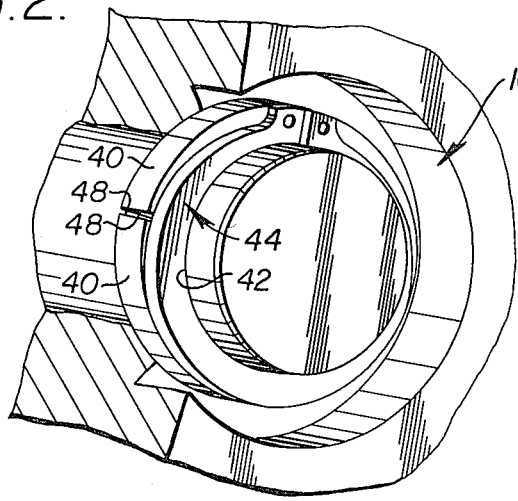
FIG. 2 is an enlarged, fragmentary, diagrammatic, perspective end view of one end of the track chain joint illustrated in FIG. 1 showing one of the keeper assemblies including a retaining member, with a portion of the joint shown in cross section for clarity.
Figure 3:
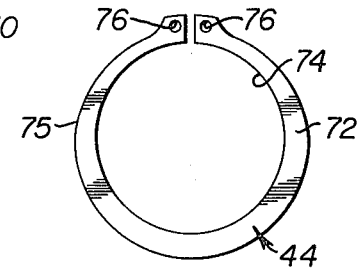
FIG. 3 is an elevational side view of the retaining member of FIG. 2.
Figure 4:
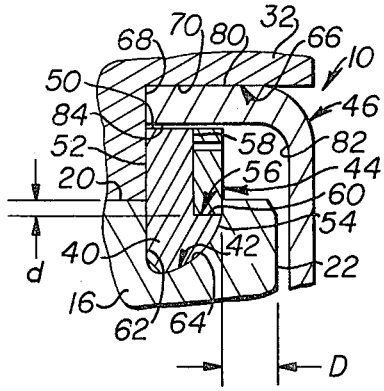
FIG. 4 is an enlarged, fragmentary, diagrammatic cross sectional view of the keeper assembly illustrated in FIGS. 1 and 2.

Referring now to the construction of the first keeper assembly 10, as best illustrated in FIGS. 2-4, it may be noted that a plurality of arcuate keeper segments 40 of preselected construction are included and received in an annular groove 42 in the track pin 16. First and second retaining means 44,46 are provided for containing the keeper segments in place in the groove, and for protecting the keeper assembly and track chain joint 14.

In the embodiment illustrated, three identical arcuate keeper segments 40 are utilized which are substantially adjacent segments of an interrupted annular ring. Each of these keeper segments has a pair of opposite end surfaces 48 as representatively indicated in FIG. 2 and as shown best in FIG. 4, a radially outer cylindrical surface 50, a planar side surface or thrust surface 52, a radially inner contoured surface 54, and an axially outwardly opening side seat or bench 56. By the term "side seat" it is meant that a recess is defined in each of the keeper segments for substantially solely axially receiving the first retaining means 44 and simplifying assembly. In the instant embodiment the side seat 56 is defined by an axially outwardly facing surface 58 oriented in use in a plane transverse to the central axis 18, and by an arcuate, radially outwardly facing surface or cylindrical surface portion 60. Advantageously, the cylindrical surface portion 60 of the side seat is disposed radially inwardly of the cylindrical outer surface 20 by a preselected radial depth "d" as indicated in FIG. 4.

The annular groove 42 opens radially outwardly on the cylindrical outer surface 20 of the pin 16 and extends continuously peripherally around the pin in the instant example. The groove is defined by a planar sidewall 62 and a concave sidewall 64 connected to each other, and is located at a preselected minimum axial distance "D" from the end surface 22 of the pin as shown in FIG. 4.

Although not clearly illustrated, the instant embodiment has three similar arcuate keeper segments 40 of about 120° span each for ease of insertion in the groove 42. But it is necessary to insert these keeper segments within the restrictive confines of an axially outwardly facing counterbore 66 in each of the track links 32. Each counterbore is defined by an annular end wall or force transmitting surface 68 and a cylindrical internal surface 70. In operation, the planar side surface 52 axially receives the force from the end wall 68.

As shown best in FIG. 3, the first retaining means 44 is seen to include an external retaining ring 72 having a substantially cylindrical internal surface 74 in the free state, a radially outer surface 75, and a pair of eyes 76 in the opposite ends thereof. The retaining ring 72 is of the usual C-shaped steel type having a gradual and symmetrical change of radial thickness around its periphery as is illustrated. The retaining ring is positionable on the side seat 56 of the individual keeper segments 40 to hold them in place before installation of the second retaining means 46.

The second retaining means 46 is substantially a retaining cap or cup 78 having an external cylindrical surface 80 and an axially inwardly facing counterbore 82 including an internal cylindrical surface 84.

INDUSTRIAL APPLICABILITY

In operation, the track links 32 are axially press fitted over the opposite ends of the track pins 16 to substantially complete the assembly of the track chain joints 14 in the usual manner. Thereafter the first and second keeper assemblies 10 and 12 are installed.

More particularly, the three arcuate keeper segments 40 are installed fully within the pin groove 42 and are preferably temporarily held in place by a sticking agent applied to the radially inner contoured surface 54 thereof. Thereafter the small tangs of a plier-like tool of the usual type are placed in the eyes 76 of the retaining ring 72 and the eyes forcefully separated so that the ring is elastically deformed, permitting it to be inserted axially over the cylindrical surface 20 of the track pin 16 and into engagement with the side seats 56 of the individual keeper segments. Thereupon the eyes are allowed to approach each other so that the ring snaps back toward its unstressed condition whereupon the internal surface 74 of the retaining ring is positioned against the cylindrical surface portions 60 of the keeper segments. Since this occurs radially down into the pin groove by the preselected distance "d" the retaining ring is held positively in place.

Thereafter, the retaining cap 78 is press fitted into the internal surface 70 of the link counterbore 66 such that the cap's internal surface 84 is disposed in preselected relatively close radial proximity to the outer cylindrical surfaces 50 of the keeper segments and to the outer surface 75 of the retaining ring.

Figure 5:
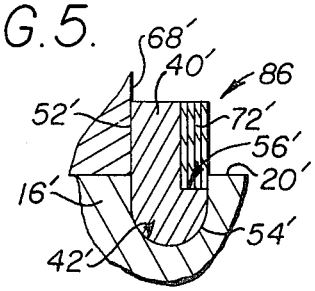
FIG. 5 is a fragmentary view, comparable to FIG. 4, showing a second embodiment retaining member.

Referring now to FIG. 5, a second embodiment keeper assembly 86 is illustrated having elements corresponding to those of the first embodiment indicated by the same reference numerals with a prime marking. The second embodiment differs only in that the keeper segment's contoured surface 54' is a semicircle in cross section rather than a quarter of a circle, and in that the retaining ring 72' is of different construction than the retaining ring 72. Specifically, the retaining ring 72' is a spiral wrap ring of relatively thin steel and of substantially radially elongate rectangular cross sectional configuration. As before, the retaining ring 72' is installed axially over the cylindrical surface 20' of the pin 16' and snapped radially into a positive engagement with the individual keeper segments 40' at the depressed side seats 56'.

It has been found that the preselected cross sectional construction of the keeper segments 40,40' and the mating groove 42,42' has greatly extended the load to failure capabilities of the keeper assemblies 10 and 86 when compared with conventional retaining ring arrangements with, for example, a groove having a sharp edged rectangular configuration. This is because the keeper segments transfer force from the abutting surfaces 52,52',68,68' radially toward the central axis 18 and obliquely into the more favorable load distributing contoured surfaces 54,54'. The dual retaining means 44,46 provide the way to assure positive assembly of the keeper segments and positive containment and protection thereof in the severe service environment of a track chain joint.

Other aspects, objects and advantages of this invention can be obtained from a study of the drawings, the disclosure and the appended claims.

I claim:
1. In a keeper assembly (10) of the type including a first member (16) having a central axis (18) and an annular groove (42) opening on an outer cylindrical surface (20), and a second member (32) having a force transmitting surface (68), the improvement comprising:
   a plurality of arcuate keeper segments (40) positionable in the groove (42) and being of a construction sufficient for transferring force from the force transmitting surface (68) of the second member (32) into the first member (16), each segment (40) having an axially outwardly opening side seat (56) having an axially outwardly facing surface (58) and an arcuate radially outwardly facing uninterrupted cylindrical surface (60); and
   retaining means (44) releasably connected to the side seats (56) for holding the arcuate keeper segments (40) positively in the groove (42), the side seats (56) being of a construction sufficient for substantially solely axially receiving the retaining means (44).
2. The keeper assembly of claim 1 wherein the retaining means (44) is an external retaining ring (72) of "C" configuration.
3. The keeper assembly of claim 1 including:
   containing means (46) for containing the keeper segments (40) and the retaining means (44), the containing means (46) extending peripherally around both the keeper segments (40) and the retaining means (44).
4. The keeper assembly of claim 3 wherein the containing means (46) is a cup (78).

5. The keeper assembly of claim 3 wherein the containing means (46) is releasably connected to the second member (32).

6. In a keeper assembly (10) of the type including a first member (16) having a central axis (18) and an annular groove (42) opening on an outer cylindrical surface (20), and a second member (32) having a force transmitting surface (68), the improvement comprising:
- a plurality of arcuate keeper segments (40) positionable in the groove (42) and being of a construction sufficient for transferring force from the force transmitting surface (68) of the second member (32) into the first member (16), each segment (40) having an axially outwardly opening side seat (56) having an axially outwardly facing surface (58) and an arcuate radially outwardly facing surface (60); and
- a ring (72') of a general spiral configuration releasably connected to the side seats (56) and being of a construction sufficient for holding the arcuate keeper segments (40) positively in the groove (42).

7. In a keeper assembly (10) of the type including a first member (16) having a central axis (18) and an annular groove (42) opening on an outer cylindrical surface (20), and a second member (32) having a force transmitting surface (68), the improvement comprising:
- a plurality of arcuate keeper segments (40) positionable in the groove (42) and being of a construction sufficient for transferring force from the force transmitting surface (68) of the second member (32) into the first member (16), each segment (40) having an axially outwardly opening side seat (56) having an axially outwardly facing surface (58) and an arcuate radially outwardly facing surface (60), each of the radially outwardly facing surfaces (60) of the side seats (56) being located at a preselected depth "d" radially inwardly of the outer cylindrical surface (20) of the first member (16); and
- retaining means (44) for holding the arcuate keeper segments (40) positively in the groove (42), the retaining means (44) being releasably connected to the side seats (56) contacting the radially outwardly facing surfaces (60).

8. The keeper assembly of claim 7 wherein the radially outwardly facing surfaces (60) are arcuate cylindrical surface portions.

* * * * *